US012558747B2

(12) United States Patent
Brosseau et al.

(10) Patent No.: US 12,558,747 B2
(45) Date of Patent: Feb. 24, 2026

(54) METHOD OF ASSEMBLING PARTS WITH DIFFERENT COEFFICIENTS OF THERMAL EXPANSION

(71) Applicant: PRATT & WHITNEY CANADA CORP., Longueuil (CA)

(72) Inventors: Dave Brosseau, Sainte-Catherine (CA); Johnny Vinski, Châteauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/473,806

(22) Filed: Sep. 25, 2023

(65) Prior Publication Data

US 2025/0100092 A1     Mar. 27, 2025

(51) Int. Cl.
B23P 11/02 (2006.01)
F02B 55/08 (2006.01)

(52) U.S. Cl.
CPC ......... B23P 11/025 (2013.01); B23P 2700/01 (2013.01); F02B 55/08 (2013.01)

(58) Field of Classification Search
CPC ...... B23P 11/025; B23P 2700/01; F02B 55/08
See application file for complete search history.

(56) References Cited

U.S. PATENT DOCUMENTS

| | | | |
|---|---|---|---|
| 4,639,194 A | 1/1987 | Bell, III et al. | |
| 5,174,660 A | * 12/1992 | Seibig | F16C 17/04 |
| | | | 384/907.1 |
| 8,661,678 B1 | * 3/2014 | Hudgins | B23P 11/025 |
| | | | 295/31.1 |
| 10,718,450 B2 | 7/2020 | Tyburcy et al. | |
| 11,542,836 B2 | 1/2023 | Menheere | |
| 2005/0169764 A1 | 8/2005 | Geoffrey et al. | |
| 2020/0200009 A1 | 6/2020 | Gagnon-Martin et al. | |

FOREIGN PATENT DOCUMENTS

JP        S6140879 A     2/1986

* cited by examiner

*Primary Examiner* — Christopher J. Besler
(74) *Attorney, Agent, or Firm* — NORTON ROSE FULBRIGHT CANADA LLP

(57)        ABSTRACT
A method of assembling parts of an aircraft engine, the method includes: forming, at a first temperature, a pre-assembly of a first part of the aircraft engine and a second part of the aircraft engine by aligning the first part and the second part such as to be engageable within one another, the second part having a coefficient of thermal expansion that is greater than a coefficient of thermal expansion of the first part; heating the pre-assembly to a second temperature greater than the first temperature to expand the second part relative to the first part; and compressing the pre-assembly until the first part is inserted into the second part to create a contact interface between the first part and the second part.

11 Claims, 9 Drawing Sheets

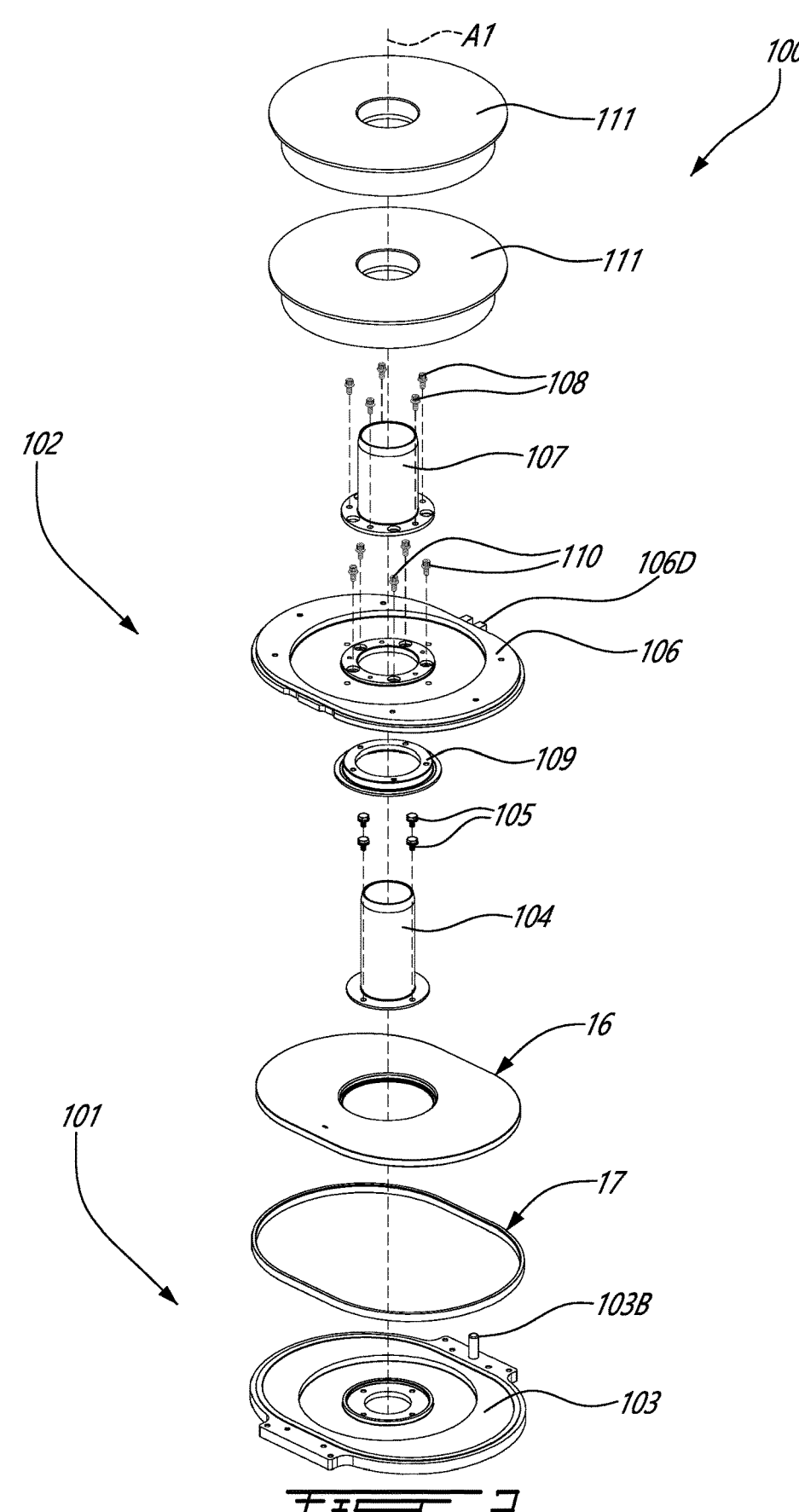
_FIG. 2_

400

Form, at a first temperature, a pre-assembly of a first part of the aircraft engine and a second part of the aircraft engine by aligning the first part and the second part such as to be engageable within one another, the second part having a coefficient of thermal expansion that is greater than a coefficient of thermal expansion of the first part

402

Heat the pre-assembly to a second temperature greater than the first temperature to expand the second part relative to the first part

404

Compress the pre-assembly until the first part is inserted into the second part to create a contact interface between the first part and the second part

406

FIG. 4

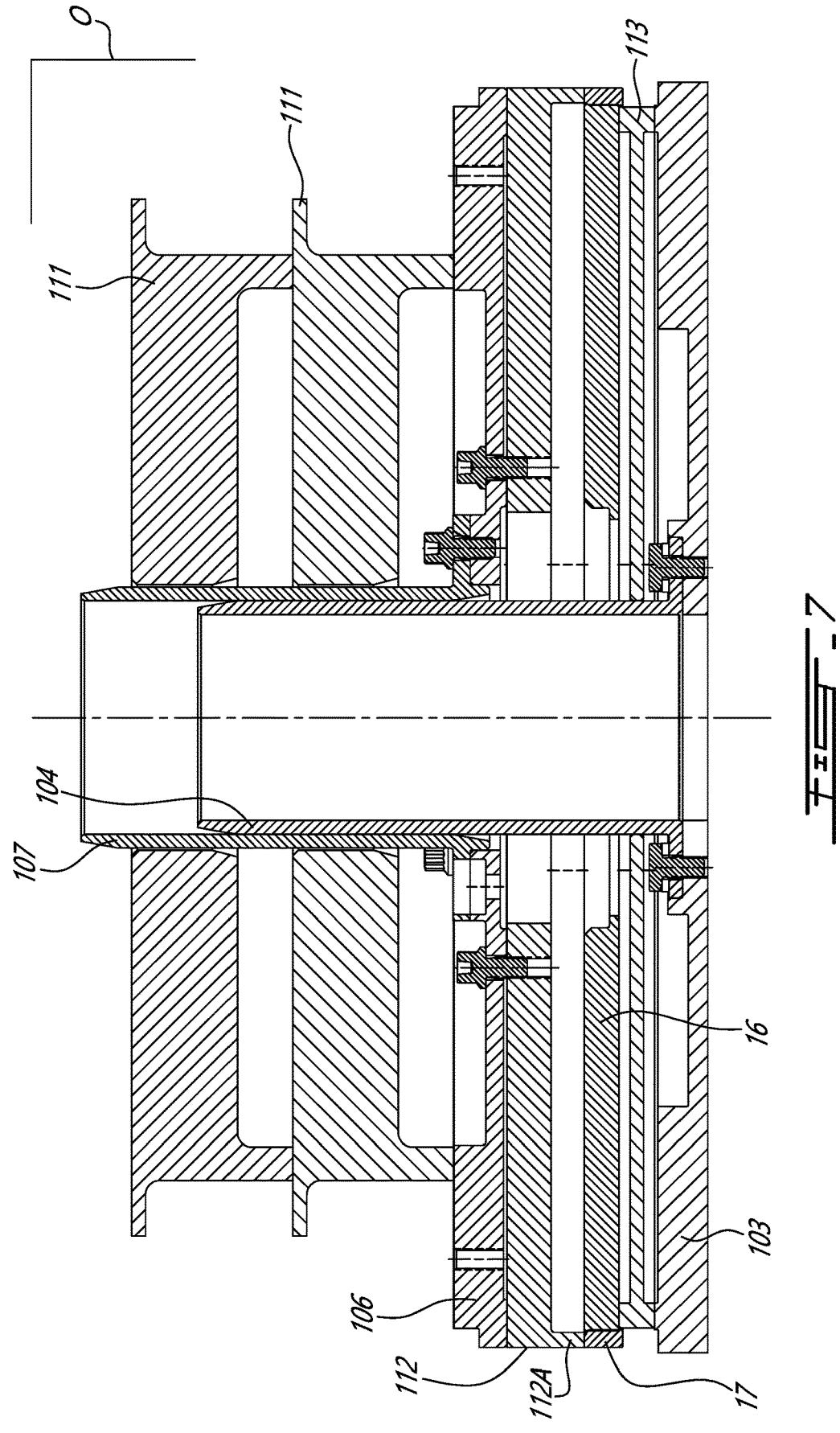
_FIG-7_

METHOD OF ASSEMBLING PARTS WITH DIFFERENT COEFFICIENTS OF THERMAL EXPANSION

TECHNICAL FIELD

The disclosure relates generally to aircraft engines and to systems and methods for assembling parts of such engines and, more particularly, for assembling parts of a rotary internal combustion engine with an interference fit.

BACKGROUND

Parts of aircraft engines are often required to be assembled with tight tolerances and/or interference fits. Typically, in the case of two parts being assembled together, one of the parts may be cooled while the other part is heated until the two parts are engageable one within the other. However, in some cases, this requires manipulation of the hot parts during the assembly process.

SUMMARY

In one aspect, there is provided a method of assembling parts of an aircraft engine, the method comprising: forming, at a first temperature, a pre-assembly of a first part of the aircraft engine and a second part of the aircraft engine by aligning the first part and the second part such as to be engageable within one another, the second part having a coefficient of thermal expansion that is greater than a coefficient of thermal expansion of the first part; heating the pre-assembly to a second temperature greater than the first temperature to expand the second part relative to the first part; and compressing the pre-assembly until the first part is inserted into the second part to create a contact interface between the first part and the second part.

The method described above may include any of the following features, in any combinations.

In some embodiments, the compressing the pre-assembly includes inserting the first part into the second part such that a peripheral outer face of the first part abuts a peripheral inner face of the second part.

In some embodiments, the compressing of the pre-assembly includes compressing the pre-assembly during the heating of the pre-assembly while the pre-assembly is in an oven.

In some embodiments, the compressing of the pre-assembly includes disposing one or more dead weights on one of the first part and the second part.

In some embodiments, the forming of the pre-assembly includes: mounting the first part on a first support and mounting the second part on a second support, the first support defining a first shaft, the second support defining a second shaft; and inserting the second shaft into the first shaft.

In some embodiments, a material of the first part is ceramic and a material of the second part is steel, the heating of the pre-assembly includes heating the pre-assembly at about 700 degrees Fahrenheit.

In some embodiments, the method includes heating the pre-assembly for at least 1 hour.

In some embodiments, the method includes guiding a peripheral outer face of the first part into a peripheral inner face of the second part with a chamfer defined by one or more of the first part and the second part.

In some embodiments, the aircraft engine is a rotary internal combustion engine, the first part being a side plate of the rotary internal combustion engine, the side plate defining a running face for a rotor of the rotary internal combustion engine, the second part is a ring, the heating of both the first part and the second part includes heating the side plate and the ring.

In some embodiments, the compressing of the pre-assembly includes compressing the pre-assembly until the side plate is received within the ring and until a face of the side plate is co-planar with an axial face of the ring.

In some embodiments, the side plate is mounted to a support plate, the support plate having a periphery extending beyond the support plate, the compressing of the pre-assembly includes applying pressure to the side plate via the support plate until the periphery of the support plate is in abutment against the axial face of the ring.

In some embodiments, the first part made of a first material having a first coefficient of thermal expansion and the second part is made of a second material having a second coefficient of thermal expansion, a ratio of the second coefficient of thermal expansion to the first coefficient of thermal expansion being at least 3.15.

In another aspect, there is provided a method of inserting a side plate of a rotary internal combustion engine into a ring, the method comprising: forming, at a first temperature, a pre-assembly of a side plate and a ring of the rotary internal combustion engine such that a peripheral outer face of the side plate is in register with a peripheral inner face of the ring, the side plate made of a material having a coefficient of thermal expansion less than a coefficient of thermal expansion of the ring; heating the pre-assembly to a second temperature greater than the first temperature to dilate the ring until the side plate is receivable within the ring; and compressing the pre-assembly to insert the side plate into the ring to create a contact interface between the peripheral inner face of the ring and the peripheral outer face of the side plate.

The method described above may include any of the following features, in any combinations.

In some embodiments, the heating of the pre-assembly includes inserting the pre-assembly of the ring and the side plate into an oven and increasing a temperature of the oven.

In some embodiments, the compressing of the pre-assembly includes compressing the pre-assembly while the pre-assembly is in the oven.

In some embodiments, the compressing of the pre-assembly includes disposing weights on one of the side plate and the ring.

In some embodiments, the forming of the pre-assembly includes: mounting the ring on a ring support and mounting the side plate on a plate support, the ring support defining a first shaft, the plate support defining a second shaft; and inserting the first shaft into the second shaft.

In some embodiments, the material of the side plate is ceramic and the material of the ring is steel, the heating of the pre-assembly includes heating the pre-assembly at about 700 degrees Fahrenheit.

In some embodiments, the method includes heating the pre-assembly for at least 1 hour.

In some embodiments, the method includes guiding the peripheral outer face into the peripheral inner face with a chamfer defined by the ring.

BRIEF DESCRIPTION OF THE DRAWINGS

Reference is now made to the accompanying figures in which:

FIG. 2 is a three dimensional exploded view of a system for assembling the ring to the side plate of the side plate assembly of FIG. 1C;

FIG. 4 is a flow chart illustrating steps of a method of assembling the ring to the side plate;

FIG. 7 is a cross-sectional view of a system for removing the ring from the side plate.

DETAILED DESCRIPTION

Figure 1A:
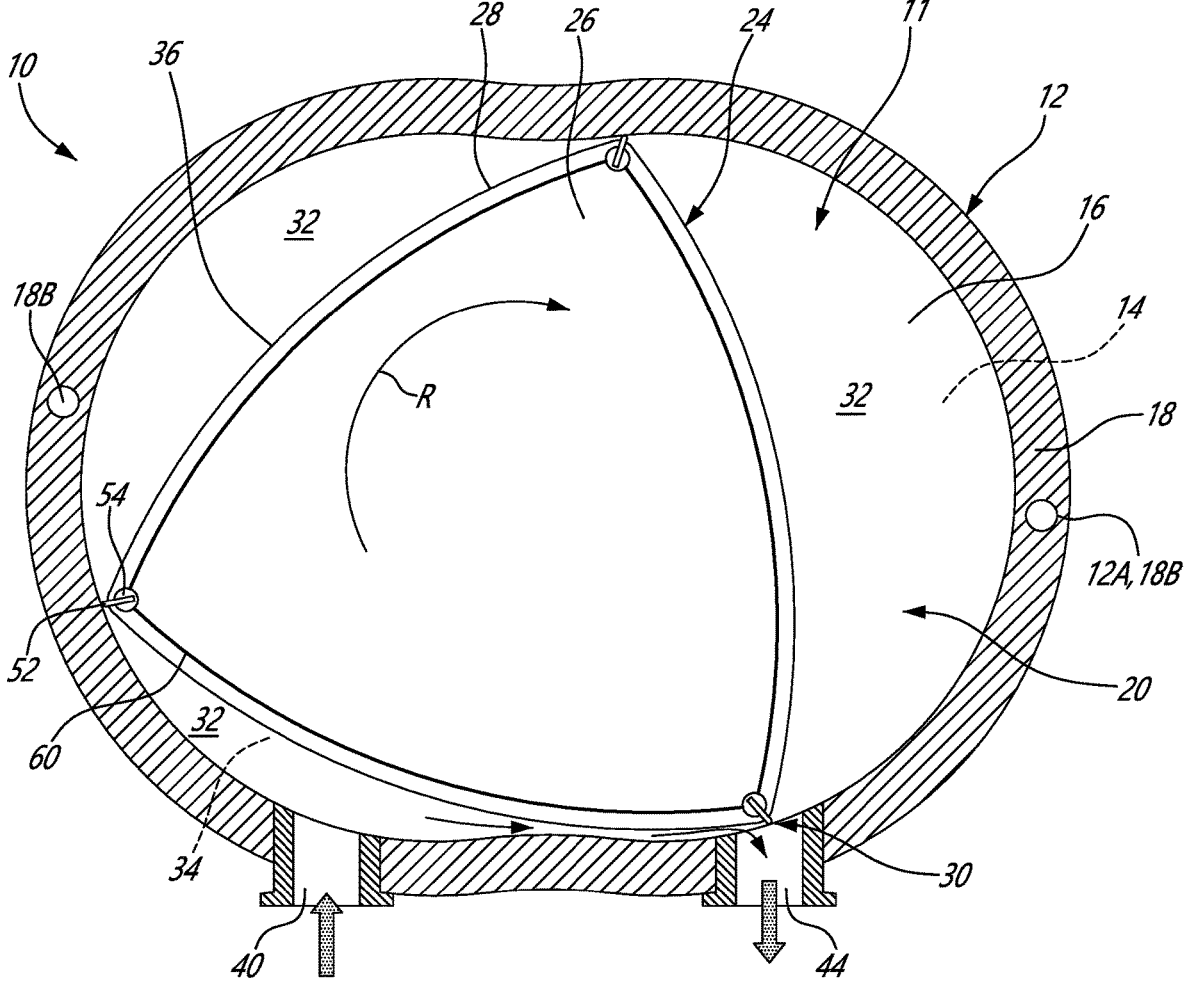
FIG. 1A is a schematic cross-sectional view of a rotary internal combustion engine in accordance with one embodiment.

Referring to FIG. 1A, a rotary internal combustion engine, referred to simply as a rotary engine below, which may be a Wankel engine, is schematically shown at 10. The rotary engine 10 comprises an outer body 12, also referred to as a housing assembly since it includes a plurality of housings mounted to one another. The outer body 12 has axially-spaced side housings 11, which each includes a side wall 14 and a side plate 16 mounted to the side wall 14, with a rotor housing 18 extending from one of the side housings 11 to the other, to form a rotor cavity 20. In FIG. 1, the side wall 14 is indicated with a dashed line because it sits behind the side plate 16. The inner surface of the rotor housing 18 of the cavity 20 has a profile defining two lobes, which may be an epitrochoid.

The outer body 12 includes a coolant circuitry 12A, which may include a plurality of coolant conduits 18B defined within the rotor housing 18. The coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side plate 16. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 1B:
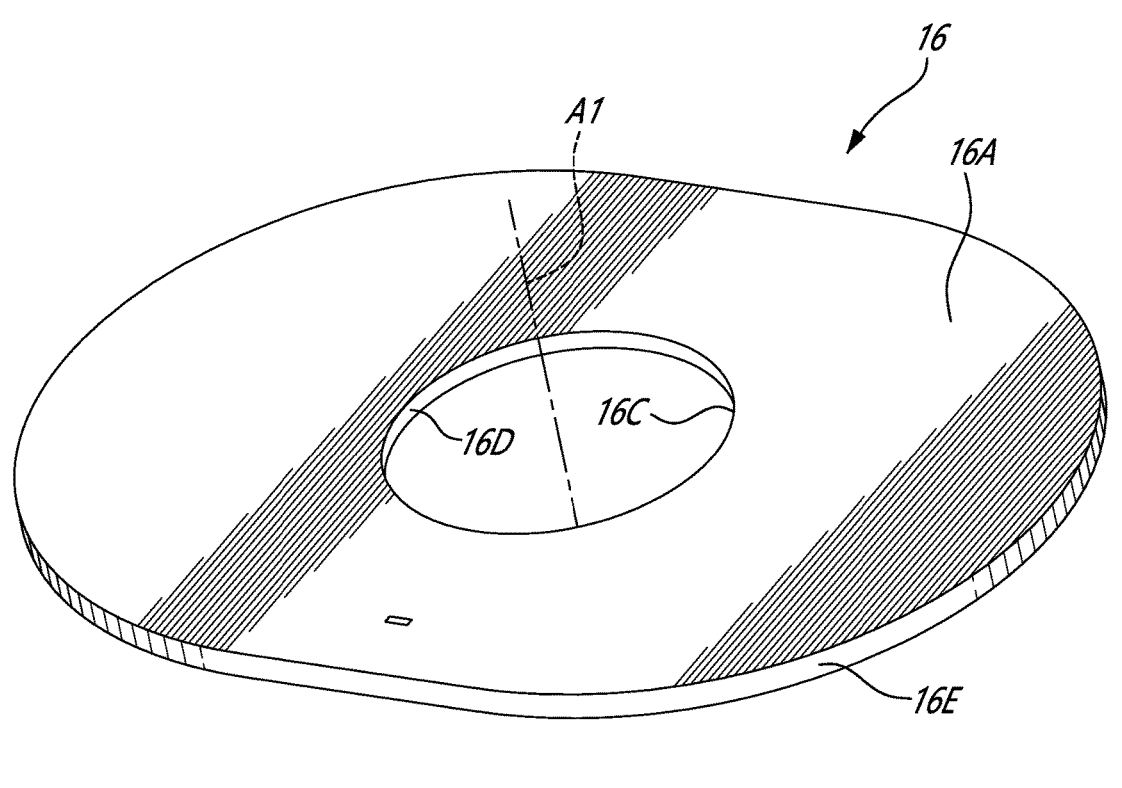
FIG. 1B is a three dimensional view illustrating a rotor-engaging face of a side plate for the rotary engine of FIG. 1A.
Figure 1C:
FIG. 1C is a cross-sectional view of a side plate assembly including the side plate of FIG. 1B and a ring.

Referring now to FIGS. 1B-1C, the side plate 16 of the rotary engine 10 is described in greater detail. In the present embodiment, the side plate 16 is part of a side plate assembly including the side plate 16 and a ring 17. The ring 17 may be part of a sealing assembly for facilitating fluid sealing between the rotor cavity 20 and the coolant conduits defined by the outer body 12. The side plate 16 has a rotor-engaging face 16A that faces the rotor 24 during use. The rotor-engaging face 16A corresponds to a face against which the rotor 24 rides during use. The side plate 16 has a back face 16B opposed to the rotor-engaging face 16A. The back face 16B faces the side wall 14 (FIG. 1A). The side plate 16 has a central hole 16C sized for receiving a shaft of the rotary engine 10. The central hole 16C is bounded by a peripheral inner face 16D. The side plate 16 extends radially from the peripheral inner face 16D to a peripheral outer face 16E relative to a central axis A1. The peripheral outer face 16E has a substantially oval or epitrochoid shape to match a shape of the rotor housing 18 (FIG. 1A).

Figure 1D:
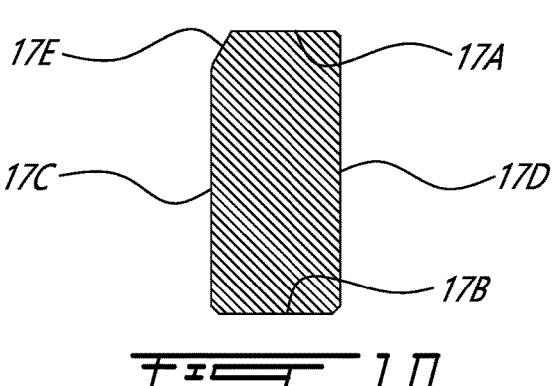
FIG. 1D is a cross-sectional view of the ring of FIG. 1C.

As shown in FIGS. 1C-1D, the ring 17 is secured around the side plate 16. More specifically, the ring 17 has a first axial face 17A, a second axial face 17B opposed to the first axial face 17A, a peripheral inner face 17C, and a peripheral outer face 17D opposed to the peripheral inner face 17C. The peripheral inner face 17C is oriented towards the central axis A1. A chamfer 17E may be provided at an intersection between the first axial face 17A and the peripheral inner face 17C. The chamfer 17E may help in assembling the ring 17 around the side plate 16 as will be further discussed below. The peripheral inner face 17C is in abutment against the peripheral outer face 16E of the side plate 16 when the ring 17 is assembled on the side plate 16.

In the embodiment shown, a tolerance fit, also referred to as an interference fit, is provided between the side plate 16 and the ring 17. Such a fit is provided since, when not assembled together, a size of the ring 17 is smaller than a size of the side plate 16. More specifically, a dimension of the peripheral inner face 17C of the ring 17 may be less than a dimension of the peripheral outer face 16E of the side plate 16. The "dimension" referred herein may be a diameter for circular or cylindrical part. Since the side plate 16 and the ring 17 have a shape different than cylindrical, the dimension may be referred to as a greatest distance between two points taken on a common plane normal to the central axis A1. For instance, the dimension of the side plate 16 may be the greatest distance between two points; the two points located at intersections between the rotor-engaging face 16A and the peripheral outer face 16E. The dimension of the ring 17 may be the greatest distance between two points; the two points located at an intersection between the peripheral inner face 17C and the first axial face 17A (or chamfer 17E).

In the exemplified embodiment, the side plate 16 is made of a ceramic material whereas the ring 17 is made of a metallic material. For example, in certain embodiments the ring 17 may be made of steel whereas the ceramic material may be silicon carbide. In alternate embodiments, the ring 17 may be made of steel, stainless steel, brass, bronze, Thoughmet™, Inconel™, titanium, molybdenum, niobium, kovar, to name a few. The material of the side plate 16 has a coefficient of thermal expansion that is less than a coefficient of thermal expansion of the material of the retaining ring 17. Therefore, assembling these two components together may be achieved by heating them. More specifically, by simultaneously heating the two components (which have different coefficients of thermal expansions) will cause an expansion (or rate of expansion) of one of the two components to be greater than an expansion (or rate of expansion) of the other of the two components. In other words, one component will expand more than the other when both components are subjected to the same increase in temperature. However, in some cases, high temperatures of about 700 degrees Fahrenheit are required for the ring 17 to expand sufficiently such that the side plate 16 may be inserted into the ring 17. These high temperature may render the components challenging to handle. In some embodiments, a ratio of the coefficient of thermal expansion of the ring 17 to the coefficient of thermal expansion of the side plate 16 is at least about 3.15, preferably at least about 4.5. The expression "about" implies variations by plus or minus 10%.

The present disclosure pertains to a system and method of assemble two components together with an interference fit when the two components differ by the coefficient of thermal expansions of their constituting materials. Although the below description focuses more specifically on the side plate 16 and the ring 17, it may be applicable to any two components in which a first component of the two components has a male portion and a second component of the two components as a female portion that needs to receive the male portion therein.

Referring to FIG. 2, a system for assembling the side plate 16 to the ring 17 is shown at 100. The system 100 is configured to pre-assemble the side plate 16 and the ring 17 until the peripheral inner face 17C of the ring 17 is in register with the peripheral outer face 16E of the side plate 16. In the context of the present disclosure, the expression "in register with" implies that the side plate 16 is oriented relative to the ring 17 such that a shape of the peripheral outer face 16E overlaps a shape of the peripheral inner face 17C. In other words, by being in register, the side plate 16 is engageable within the ring 17. In the case of the side plate 16 and the ring 17, the two peripheral faces are in register with one another when a long axis of the side plate 16 is disposed parallel to a long axis of the ring 17. Thus, by being in register, outlines of both of peripheral faces are substantially overlapping one another in a similar way as in a jigsaw puzzle. By being in register as such, the back face 16B of the side plate 16 may be substantially free of contact with the first axial face 17A of the ring 17 but at edges of those two parts.

The system 100 is further configured to maintain the side plate 16 and the ring 17 in the pre-assemble configuration. The system 100 and a pre-assembly of the side plate 16 and the ring 17 may be inserted as whole into an oven or autoclave and heated from a first temperature, which may be an ambient temperature, to a second temperature greater than the first temperature. The heating may increase a size of the peripheral inner face 17C beyond a size of the peripheral outer face 16E. The system 100 is further configured to apply pressure on either one or both of the side plate 16 and the ring 17 until the peripheral outer face 16E abuts the peripheral inner face 17C to create a contact interface P (FIG. 1C) between these two parts. The expression "contact interface" implies that the peripheral outer face 16E abuts the peripheral inner face 17C sufficiently to create a surface area of contact at the contact interface P. These two faces axially overlap one another relative to the central axis A1 at the contact interface P.

Still referring to FIG. 2, the system 100 includes a ring support 101 and a plate support 102. The plate support 102 is engageable to the ring support 101 to maintain the side plate 16 and the ring 17 in proper relative alignment for the subsequent step of assembling them. The ring support 101 includes a base plate 103. The ring 17 is laid onto the base plate 103. A first shaft 104 is securable to the base plate 103 with first fasteners 105. The plate support 102 includes a top plate 106. A second shaft 107 is securable to the top plate 106 via second fasteners 108. The first shaft 104 is insertable within the second shaft 107. The first shaft 104 has an outer diameter substantially corresponding to an inner diameter of the second shaft 107 to allow a sliding engagement of the first shaft 104 into the second shaft 107 while minimizing relative movements therebetween in a radial direction relative to the central axis A1. A retaining clamp 109 is securable to the top plate 106 via third fasteners 110. The retaining clamp 109 is used to secure the side plate 16 to the top plate 106 as described below. One or more dead or static weight 111 may be disposed over the top plate 106 to apply pressure on the side plate 16 via the top plate 106 of the plate support 102.

Figure 3:
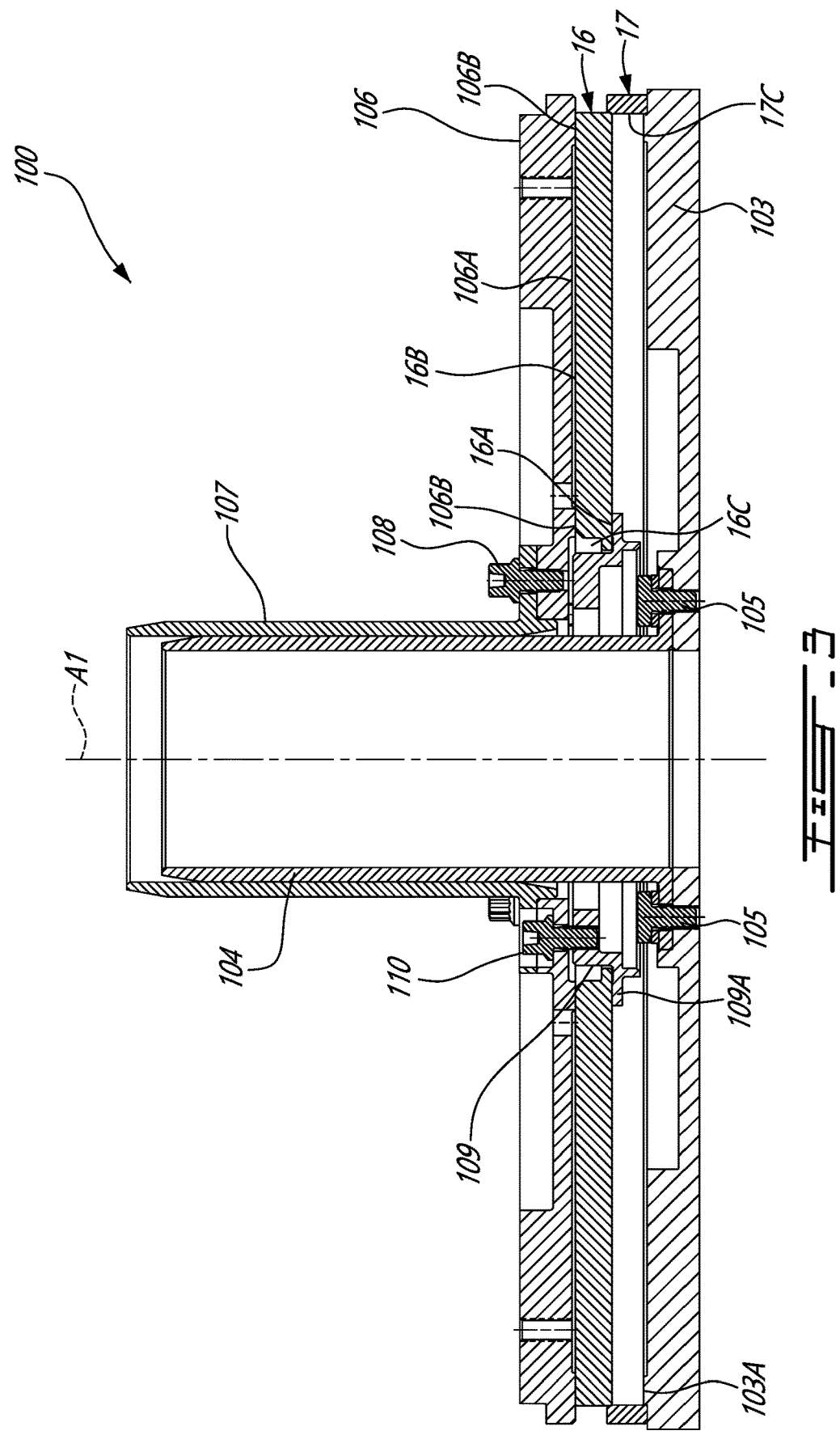
FIG. 3 is a cross-sectional view of the system of FIG. 2.

Referring to FIG. 3, in the embodiment shown, the retaining clamp 109 defines a peripheral flange 109A that as a diameter greater than that of the central hole 16C of the side plate 16. Thus, the back face 16B of the side plate 16 is in abutment against the peripheral flange 109A of the retaining clamp 109. The side plate 16 is in sandwich between the peripheral flange 109A of the retaining clamp 109 and the top plate 106. The side plate 16 is therefore axially locked to the plate support 102. The top plate 106 defines an annular recess 106A located radially between two annular faces 106B. The rotor-engaging face 16A of the side plate 16 abuts the two annular faces 106B of the top plate 106. The rotor-engaging face 16A is thus free of contact with the top plate 106 at the annular recess 106A. This may minimize a contact area between the top plate 106 and the side plate 16 to minimize an area that need to be precision machined on the top plate 106.

The base plate 103 defines a locating protrusion 103A that extends annularly around the central axis A1. This locating protrusion 103A is sized to sit internally of the ring 17 to radially locate the ring 17. As shown, the ring 17 extends around the locating protrusion 103A and the peripheral inner face 17C of the ring 17 abuts the locating protrusion 103A. The locating protrusion 103A may thus limit any radial movements of the ring 17 relative to the central axis A1.

A method of assembling the different component of the system 100 is described below. It will be appreciated that the steps described may be carried in a different order.

The first shaft 104 may be secured to the base plate 103 via the first fasteners 105, or any other suitable fastening means. The ring 17 may be laid over the base plate 103 and disposed such that the ring 17 abuts the locating protrusion 103A. Then, the second shaft 107 may be secured to the top plate 106 via the second fasteners 108, or any other suitable fastening means. At which point, the side plate 16 may be laid against the two annular faces 106B of the top plate 106 and the retaining clamp 109 may be inserted into the central hole 16C of the top plate 106 such that the side plate 16 is sandwiched between the peripheral flange 109A and the top plate 106. The third fasteners 110, or any other suitable fastening means, may be used to secure the top plate 106 to the retaining clamp 109. Then, an assembly of the second shaft 107, top plate 106, retaining clamp 109, and side plate 16 may be moved towards the base plate 103 while inserting the first shaft 104 into the second shaft 107 thereby guiding the side plate 16 into proper orientation relative to the ring 17. It may be required to rotate the side plate 16 relative to the ring 17 until they are in register with one another.

Alternatively, the clamp 109 may be placed onto the base plate 103. The side plate 16 may be placed onto the ring 17, centered with the chamfer. The top plate 106 may then be placed onto the side plate 16. There is a dowel pin 103B (FIG. 2) on the base plate 103 that clocks the top plate 106 with the base plate 103. The dowel pin 103B is received within a notch 106D (FIG. 2). Other locating means may be used or avoided in some embodiments. The clamp 109 is bolted to secure the side plate 16 to the top plate 106. Then the weights 111 may be added.

Referring to FIG. 4, a method of assembling parts of an aircraft engine is shown at 400. The parts may be the ring 17 and the side plate 16 of the rotary engine 10. However, the method 400 described below may be used to assemble any parts in which a tolerance or interference fit is required.

The method 400 may include obtaining a first part and a second part, a material of the first part having a coefficient of thermal expansion less than a coefficient of thermal expansion of a material of the second part. The first part may correspond to the side plate 16 whereas the second part may correspond to the ring 17 of the rotary engine 10. The method 400 includes forming, at a first temperature, a pre-assembly of the first part and the second part by aligning the first part and the second part such as to be engageable within one another at 402. In this orientation, a peripheral outer face 16E of the first part is in register with a peripheral inner face 17C of the second part. Then, the method 400 includes heating the pre-assembly to a second temperature greater than the first temperature to expand the second part relative to the first part at 404; and compressing the pre-assembly until the first part is inserted into the second part to create a contact interface P between the first part and the second part at 406. The contact interface P is defined between the peripheral outer face 16E and the peripheral inner face 17C contacting each other. The first temperature may be an ambient temperature.

Figure 5:
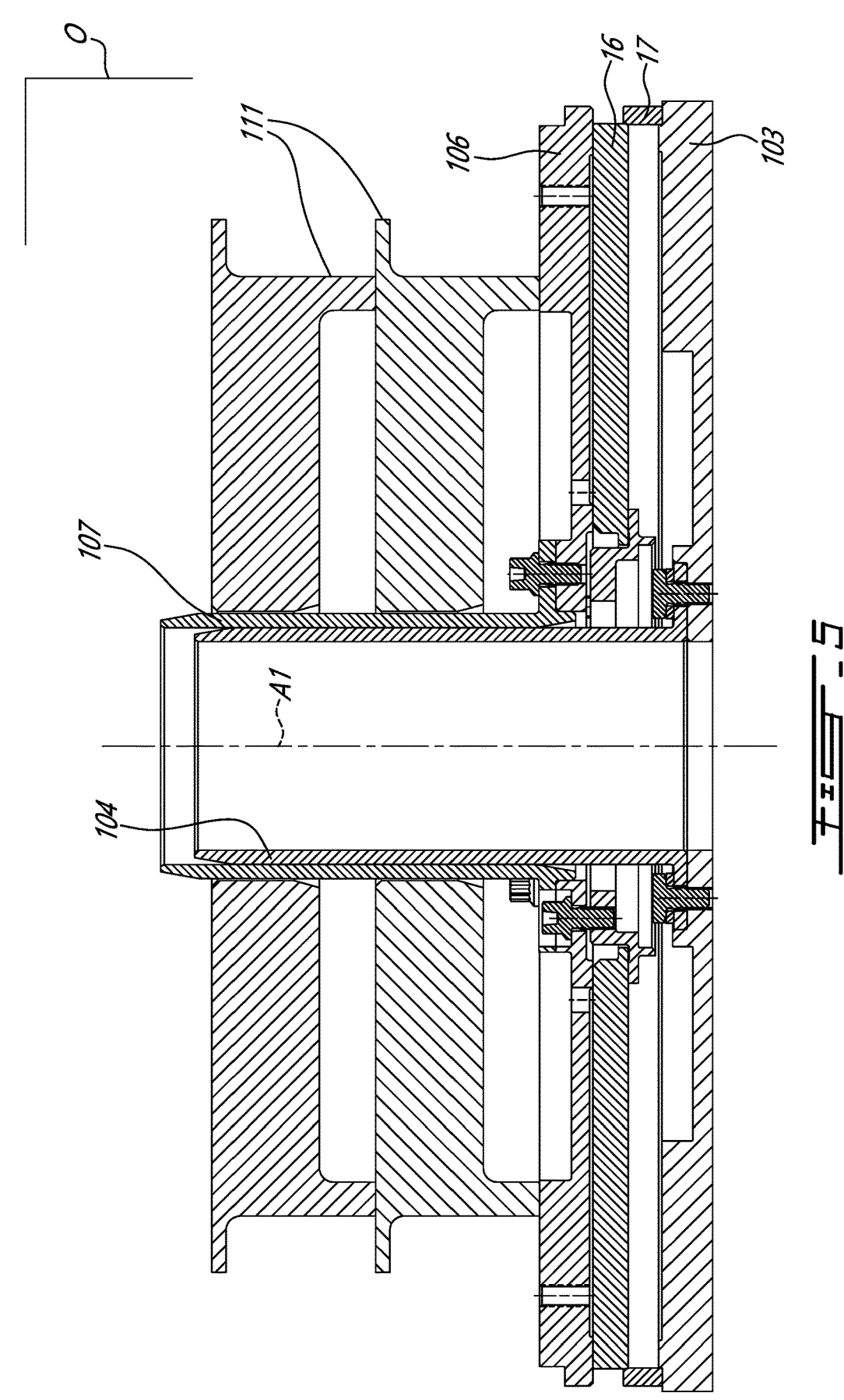
FIG. 5 is another cross-sectional view of the system of FIG. 2 illustrating the side plate 16 in register with the ring but not assembled to the ring.

As depicted in FIG. 5, which illustrates the system 100 being pre-assembled and before the side plate 16 is inserted in the ring 17, the heating of both the first part and the second part at 404 includes inserting a pre-assembly of the first part and the second part into an oven O and increasing a temperature of the oven O. The compressing of the pre-assembly at 406 may include compressing the pre-assembly while the pre-assembly is in the oven O. In some embodiments, the compressing of the pre-assembly at 406 includes disposing one or more weights 111 on one of the first part and the second part. In the present embodiment, the weights 111 are disposed over the top plate 106, which transfers a force to the side plate 16.

As previously described with reference to FIGS. 2-3, the pre-assembling of the first part and the second part includes: mounting the first part on a first support and mounting the second part on a second support, the first support defining a first shaft, the second support defining a second shaft. In the exemplified embodiment, the first support is the plate support 102 and the second support ins the ring support 101. The pre-assembling then includes inserting the first shaft 104 into the second shaft 107. These shafts are concentric and are sized so that a sliding engagement is defined when they are mated to limit any radial movements and tilting relative to the axis A1. Since the ring 17 and the side plate 16 are not circular, the pre-assembling may include rotating the ring 17 and the side plate 16 relative to one another about the axis A1 until they are in register as explained above.

In the depicted embodiment, the material of the first part (e.g., side plate 16) is ceramic and the material of the second part (e.g., ring 17) is steel. The heating of the pre-assembly at 404 includes heating the pre-assembly at about 700 degrees Fahrenheit. In the present embodiment, the method 400 includes heating the pre-assembly for at least 1 hour.

As shown in FIG. 1D, the chamfer 17E of the ring 17 is used for guiding the peripheral outer face 16E into the peripheral inner face 17C. The chamfer may be defined by the side plate 16 or by both of the ring 17 and the side plate 16 in an alternate embodiment.

Figure 6:
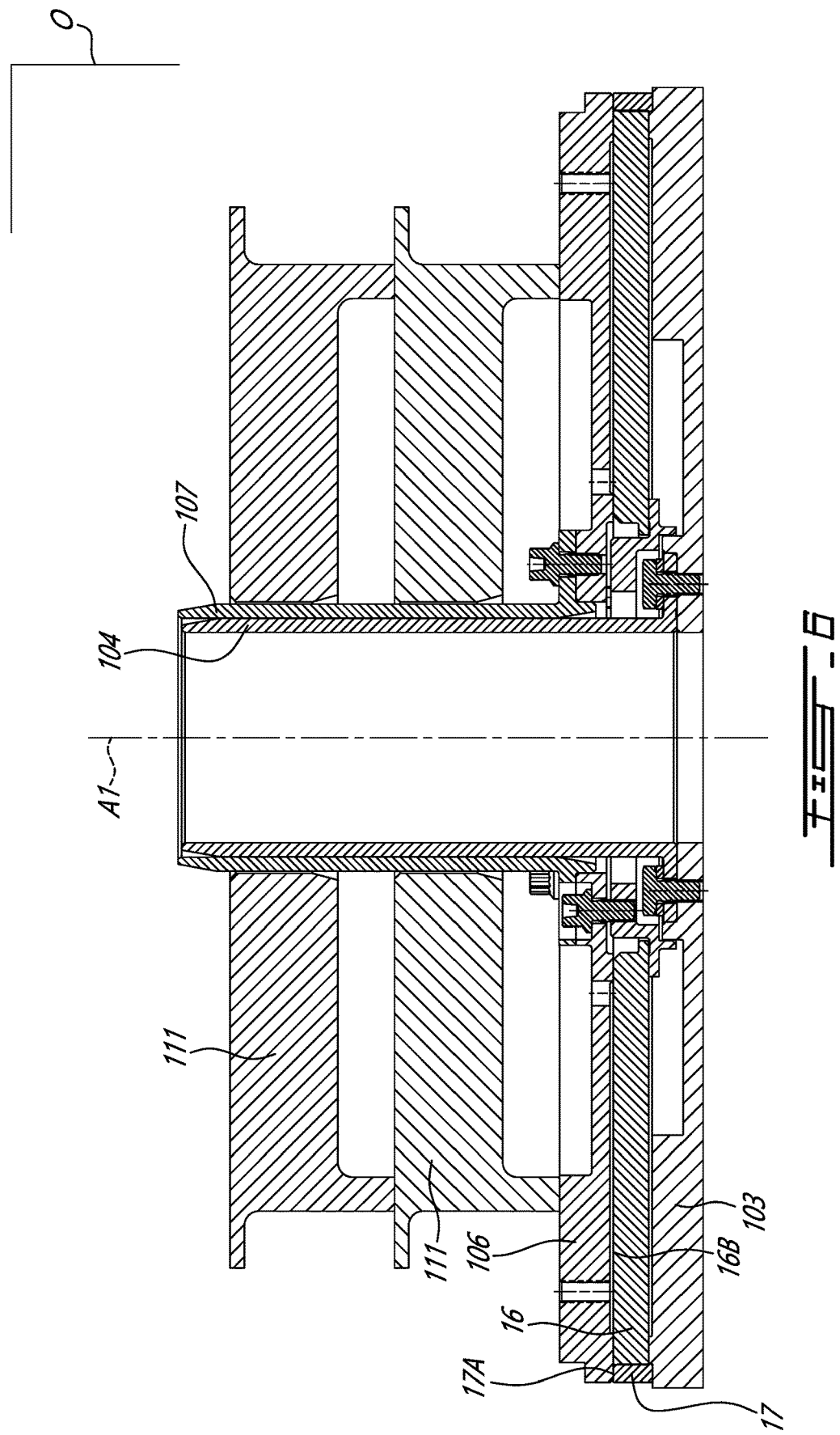
FIG. 6 is another cross-sectional view of the system of FIG. 2 illustrating the ring and the side plate assembled together.

Referring to FIG. 6, which illustrates the system 100 with the side plate 16 being received within the ring 17 by the application of the pressure by the weights 111. Herein, the pressure is applied on the side plate 16, which is located above the ring 17. Alternatively, the pressure may be applied on the ring 17 that may be located above the side plate 16.

In the exemplified embodiment, it is desired that the first axial face 17A of the ring 17 be co-planar with the rotor-engaging face 16A of the side plate 16. Hence, the compressing of the pre-assembly at 406 includes compressing the pre-assembly until the back face 16B of the side plate 16 is co-planar with the first axial face 17A of the ring 17. This may be achieved by having the top plate 106 having a periphery extending beyond the side plate 16 and overlapping both of the side plate 16 and the ring 17 such that the ring 17 acts as a stopper preventing further axial movement of the side plate 16 relative to the ring 17 once the rotor-engaging face 16A of the side plate 16 is co-planar with the first axial face 17A of the ring 17 and once the top plate 106 abuts the ring 17.

As shown in FIG. 7, it may be desired to remove the ring 17 from the side plate 16 to replace either one of these components. To do so, the top plate 106 may be secured to a removal plate 112 that defines an annular flange 112A protruding axially from a remainder of the removal plate 112. The removal plate 112 is secured to the top plate 106 via fasteners or any suitable means. A size of the annular flange 112A corresponds to that of the ring 17. The side plate 16 is supported by an intermediate plate 113 having a size less than the peripheral outer face 16E of the side plate 16. Thus, to remove the ring 17 from the side plate 16, the assembly shown in FIG. 7 is inserted in the oven O and heated up to about 700 degrees Fahrenheit until the size of the peripheral inner face 17C of the ring 17 is greater than that of the peripheral outer face 16E of the side plate 16. Then, a force generated by the weights 111 and applied to the ring 17 via the annular flange 112A pushes on the ring 17 while the side plate 16 is supported by the intermediate plate 113 to allow an axial movement of the ring 17 relative to the side plate 16. The ring 17 thus moves downwardly while the side plate 16 stays immobile until the two components are free of a contact interface therebetween.

Figure 8:
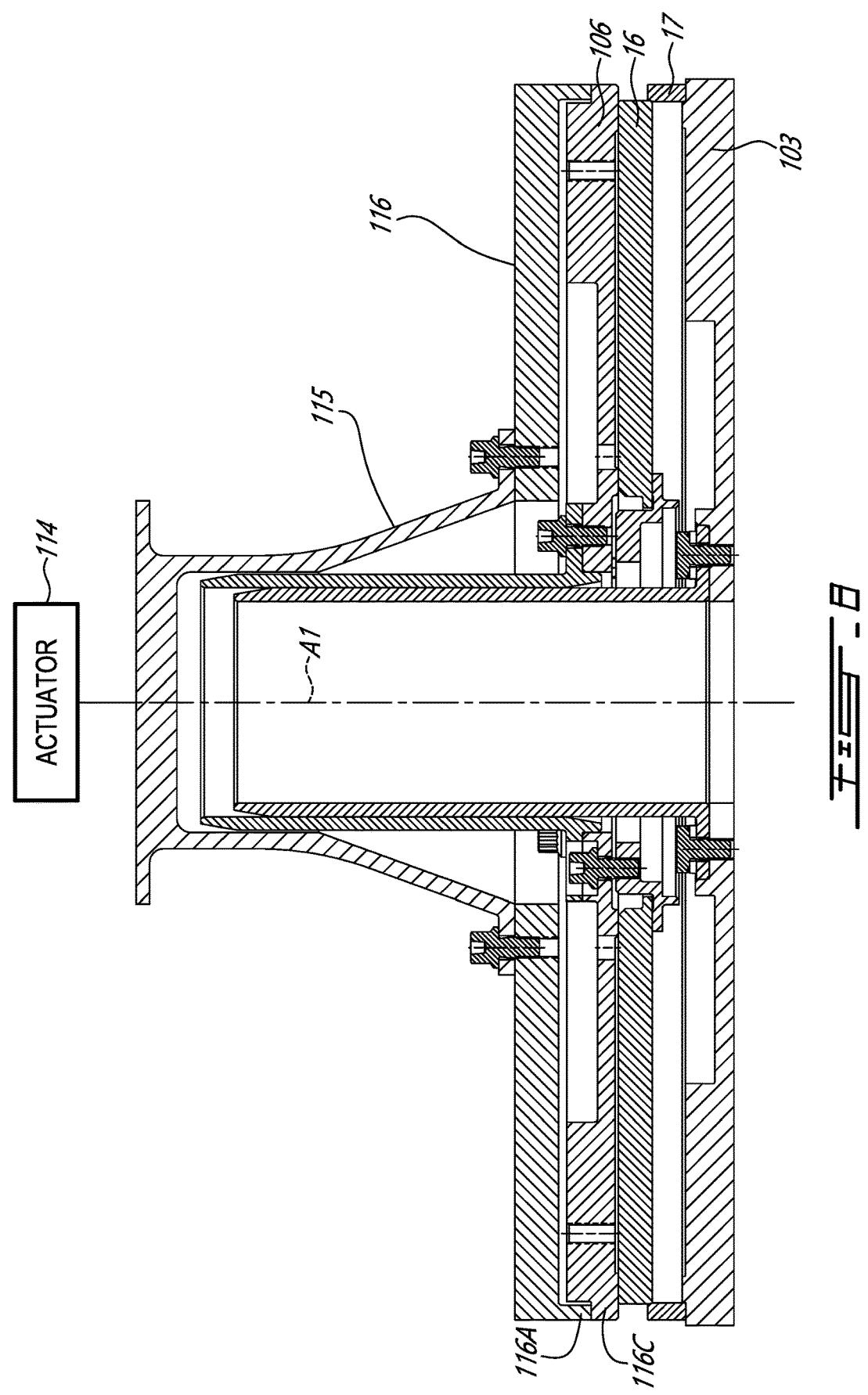
FIG. 8 is a cross-sectional view of a system for assembling the ring to the side plate in accordance with another embodiment.

Referring now to FIG. 8, in some embodiments, the compressing may be carried by an actuator 114, such as a hydraulic actuator or any suitable actuator. The actuator 114 is connected to an extension 115 that is itself secured to the top plate 106 via a transmission plate 116 defining an annular flange 116A at its outer periphery. The annular flange 116A abuts an annular shoulder 106C of the top plate 106 at its outer periphery. This may transmit the force at a location being substantially radially aligned with the peripheral outer face 16E of the side plate 16 and the peripheral inner face 17C of the ring 17.

The disclosed systems may facilitate the assembly of two parts with an interference fit when it is required to heat the two parts. The disclosed systems may be safer for technicians carrying out these operations.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of assembling parts of an aircraft engine, the method comprising:

forming, at a first temperature, a pre-assembly of a first part of the aircraft engine and a second part of the aircraft engine by aligning the first part and the second part such as to be engageable within one another, including securing the first part to a first support and securing the second part to a second support, the aligning of the first part and the second part includes engaging the first support to the second support, the engaging of the first support to the second support includes engaging a first shaft of the first support to a second shaft of the second support such that one of the first shaft and the second shaft is received into the other of the first shaft and the second shaft, the second part having a coefficient of thermal expansion that is greater than a coefficient of thermal expansion of the first part;

after the aligning of the first part and the second part, heating the pre-assembly to a second temperature greater than the first temperature to expand the second part relative to the first part; and compressing the pre-assembly until the first part is inserted into the second part to create a contact interface between the first part and the second part.

2. The method of claim 1, wherein the compressing the pre-assembly includes inserting the first part into the second part such that a peripheral outer face of the first part abuts a peripheral inner face of the second part.

3. The method of claim 2, wherein the compressing of the pre-assembly includes compressing the pre-assembly during the heating of the pre-assembly while the pre-assembly is in an oven.

4. The method of claim 1, wherein the compressing of the pre-assembly includes disposing one or more dead weights on one of the first part and the second part.

5. The method of claim 1, wherein a material of the first part is ceramic and a material of the second part is steel, the heating of the pre-assembly to the second temperature includes heating the pre-assembly to the second temperature being about 700 degrees Fahrenheit.

6. The method of claim 5, wherein the heating of the pre-assembly to the second temperature comprises maintaining the pre-assembly at the second temperature for at least 1 hour.

7. The method of claim 1, wherein the compressing of the pre-assembly includes guiding a peripheral outer face of the first part into a peripheral inner face of the second part with a chamfer defined by one or more of the first part and the second part.

8. The method of claim 1, wherein the aircraft engine is a rotary internal combustion engine, the first part being a side plate of the rotary internal combustion engine, the side plate defining a running face for a rotor of the rotary internal combustion engine, the second part is a ring, the heating of both the first part and the second part includes heating the side plate and the ring.

9. The method of claim 8, wherein the compressing of the pre-assembly includes compressing the pre-assembly until the side plate is received within the ring and until a face of the side plate is co-planar with an axial face of the ring.

10. The method of claim 9, wherein the side plate is mounted to a support plate, the support plate having a periphery extending beyond the side plate, the compressing of the pre-assembly includes applying pressure to the side plate via the support plate until the periphery of the support plate is in abutment against the axial face of the ring.

11. The method of claim 1, wherein the first part made of a first material having a first coefficient of thermal expansion and the second part is made of a second material having a second coefficient of thermal expansion, a ratio of the second coefficient of thermal expansion to the first coefficient of thermal expansion being at least 3.15.

* * * * *